United States Patent
Tuts et al.

(10) Patent No.: US 9,067,471 B2
(45) Date of Patent: Jun. 30, 2015

(54) PISTON ASSEMBLY WITH OPEN BLEED

(71) Applicant: Tenneco Automotive Operating Company Inc., Lake Forest, IL (US)

(72) Inventors: Jean-Marie Tuts, Wellen (BE); Patrick Massonet, Sint-Truiden (BE); Ronny Vanbrabant, Heusden-Zolder (BE); Kristoff Six, Hasselt (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/191,538

(22) Filed: Feb. 27, 2014

(65) Prior Publication Data

US 2014/0262655 A1    Sep. 18, 2014

Related U.S. Application Data

(60) Provisional application No. 61/786,678, filed on Mar. 15, 2013.

(51) Int. Cl.
*F16F 9/34* (2006.01)
*B60G 13/08* (2006.01)

(52) U.S. Cl.
CPC ............ *B60G 13/08* (2013.01); *B60G 2202/24* (2013.01)

(58) Field of Classification Search
USPC .......... 188/282.1–282.6, 313, 322.15, 322.22
See application file for complete search history.

(56) References Cited

U.S. PATENT DOCUMENTS

| 4,905,799 | A | * | 3/1990 | Yamaoka et al. | ........ 188/322.15 |
|---|---|---|---|---|---|
| 5,148,897 | A | | 9/1992 | Vanroye | |
| 6,460,664 | B1 | * | 10/2002 | Steed et al. | ............. 188/322.15 |
| 6,644,445 | B2 | | 11/2003 | Dodge | |
| 6,672,436 | B1 | | 1/2004 | Keil et al. | |
| 8,069,964 | B2 | * | 12/2011 | Deferme | ................... 188/322.22 |
| 2004/0069581 | A1 | * | 4/2004 | Shinata | .................... 188/322.15 |
| 2005/0051395 | A1 | | 3/2005 | Deferme | |
| 2009/0057080 | A1 | * | 3/2009 | Deferme | ....................... 188/313 |

OTHER PUBLICATIONS

Search Report and Written Opinion in corresponding PCT Application No. PCT/US2014/019358 dated Jun. 10, 2014 (8 pages).

* cited by examiner

*Primary Examiner* — Christopher Schwartz
(74) *Attorney, Agent, or Firm* — Harness, Dickey & Pierce, P.L.C.

(57) ABSTRACT

A shock absorber includes a piston which has at least one compression fluid passage, at least one rebound fluid passage and at least one bleed fluid passage. A compression valve assembly closes the at least one compression passage and a rebound valve assembly closes the at least one rebound passage. A bleed valve assembly with the bleed fluid passage defines a first, always open flow path through the piston and a second flow path, separate from the first flow path, through the piston. A bleed disc is movable between a first position where the second flow path is open and a second position where the second flow path is closed.

19 Claims, 9 Drawing Sheets

PISTON ASSEMBLY WITH OPEN BLEED

CROSS-REFERENCE TO RELATED APPLICATIONS

This application claims the benefit of U.S. Provisional Application No. 61/786,678, filed on Mar. 15, 2013. The entire disclosure of the above application is incorporated herein by reference.

FIELD

The present disclosure relates generally to automotive dampers or shock absorbers which receive and dampen mechanical shock. More particularly, the present disclosure relates to a hydraulic valve assembly for the shock absorber which includes two separate bleed restriction paths which generate low damping forces at very low piston velocity.

BACKGROUND

The statements in this section merely provide background information related to the present disclosure and may not constitute prior art.

Shock absorbers are used in conjunction with automotive suspension systems to absorb unwanted vibrations which occur during driving. To absorb these unwanted vibrations, shock absorbers are generally connected between the sprung portion (body) and the unsprung portion (wheels) of the automobile. A piston is located within a working chamber defined by a pressure tube of the shock absorber, with the piston being connected to the sprung portion of the automobile through a piston rod. The pressure tube is connected to the unsprung portion of the automobile by one of the methods known in the art. Because the piston is able, through valving, to limit the flow of damping fluid between opposite sides of the piston, when the shock absorber is compressed or extended, the shock absorber is able to produce a damping force which dampens the unwanted vibration which would otherwise be transmitted from the unsprung portion to the sprung portion of the automobile. In a dual tube shock absorber, a fluid reservoir is defined between the pressure tube and the reserve tube. When a full displacement piston valving system is used, the fluid reservoir is in direct communication with the lower portion of the working chamber defined by the pressure tube (the area below the piston). All damping forces produced by the shock absorber are the result of piston valving when a full displacement valving system is used. The greater the degree to which the flow of fluid within the shock absorber is restricted by the piston, the greater the damping forces which are generated by the shock absorber. Thus, a highly restricted flow of fluid would produce a firm ride while a less restricted flow of fluid would produce a soft ride.

In selecting the amount of damping that a shock absorber is to provide, at least three vehicle performance characteristics are considered. These three characteristics are ride comfort, vehicle handling and road holding ability. Ride comfort is often a function of the spring constant for the main springs of the vehicle as well as the spring constant for the seat and tires and the damping coefficient of the shock absorber. For optimum ride comfort, a relatively low damping force or a soft ride is preferred.

Vehicle handling is related to the variation in the vehicle's attitude (i.e., roll, pitch and yaw). For optimum vehicle handling, relatively large damping forces, or a firm ride, are required to avoid excessively rapid variations in the vehicle's attitude during cornering, acceleration and deceleration.

Finally, road holding ability is generally a function of the amount of contact between the tires and the ground. To optimize road handling ability, large damping forces, or a firm ride, are required when driving on irregular surfaces to prevent loss of contact between the wheel and the ground for excessive periods of time.

Various types of shock absorbers have been developed to generate the desired damping forces in relation to the various vehicle performance characteristics. Shock absorbers have been developed to provide different damping characteristics depending on the speed or acceleration of the piston within the pressure tube. Because of the exponential relation between pressure drop and flow rate, it is a difficult task to obtain a damping force at relatively low piston velocities, particularly at velocities near zero. Low speed damping force is important to vehicle handling since most vehicle handling events are controlled by low speed vehicle body velocities.

Various prior art systems for tuning shock absorbers during low speed movement of the piston create a fixed low speed bleed orifice which provides a bleed passage which is always open across the piston. This bleed orifice can be created by utilizing orifice notches positioned either on the flexible disc adjacent to the sealing land or by utilizing orifice notches directly in the sealing land itself. The limitations of these designs is that because the orifice is constant in cross-sectional area, the created damping force is not a function of the internal pressures of the shock absorber. In order to obtain the low speed control utilizing these open orifice notches, the orifice notches have to be small enough to create a restriction at relatively low velocities. When this is accomplished, the low speed fluid circuit of the valving system will operate over a very small range of velocity. Therefore, the secondary or high-speed stage valving is activated at a lower velocity than is desired. Activation of the secondary valving at relatively low velocities creates harshness because of the shape of the fixed orifice bleed circuit force velocity characteristic is totally different in configuration than the shape of the high-speed circuit.

Prior art attempts at overcoming the problems of fixed orifice bleed valving and thus eliminate harshness during low speed piston movements have included the incorporation of a variable orifice bleed valving circuit. As the velocity of the piston increases, the flow area of the variable orifice would also increase in order to smooth the transition to the secondary valving. These prior art variable orifice bleed valving circuits are typically located at the outer periphery of the flexible valve disc and thus they are dependent on the diameter of the disc to determine the rate at which the flow area increases. As the diameter of the flexible disc increases, it becomes more difficult to control the rate at which the flow area of the orifice increases. Since the flow area is increased by the deflection of the variable orifice bleed disc, a small deflection in a large diameter variable orifice bleed disc provides a rapid increase in the flow area of the bleed orifice. This rapid increase in the flow area complicates the tuning between the low speed valving circuit and the secondary or high-speed valving circuit.

Still other prior art systems have developed variable orifice bleed valving circuits which are integrated with the mid/high speed valving systems. The integration of the low speed circuit with the mid/high speed circuit creates a system where the tuning of the low speed circuit affects the mid/high speed circuit and the tuning of the mid/high speed circuit affects the low speed circuit.

The continued development of shock absorbers includes the development of a valving system which can provide a smooth transition between the low speed valving circuit and the secondary valving or high speed valving circuit. The smooth transition between these two circuits helps to reduce and/or eliminate any harshness during the transition. In addition to the smooth transition, the development of these systems has also been directed towards the separation of these two circuits in order to be able to independently tune each of these circuits.

SUMMARY

The present disclosure provides a method for independently tuning damping forces at low piston velocities in order to improve the low speed damping characteristics of the shock absorber. The present disclosure includes a separate low speed variable orifice bleed circuit which is separate from the mid/high speed or secondary valving system. In addition, the present disclosure includes a pair of fluid flow paths where one of the flow paths closes at a specified piston velocity in order to tune the low speed damping characteristics of the shock absorber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
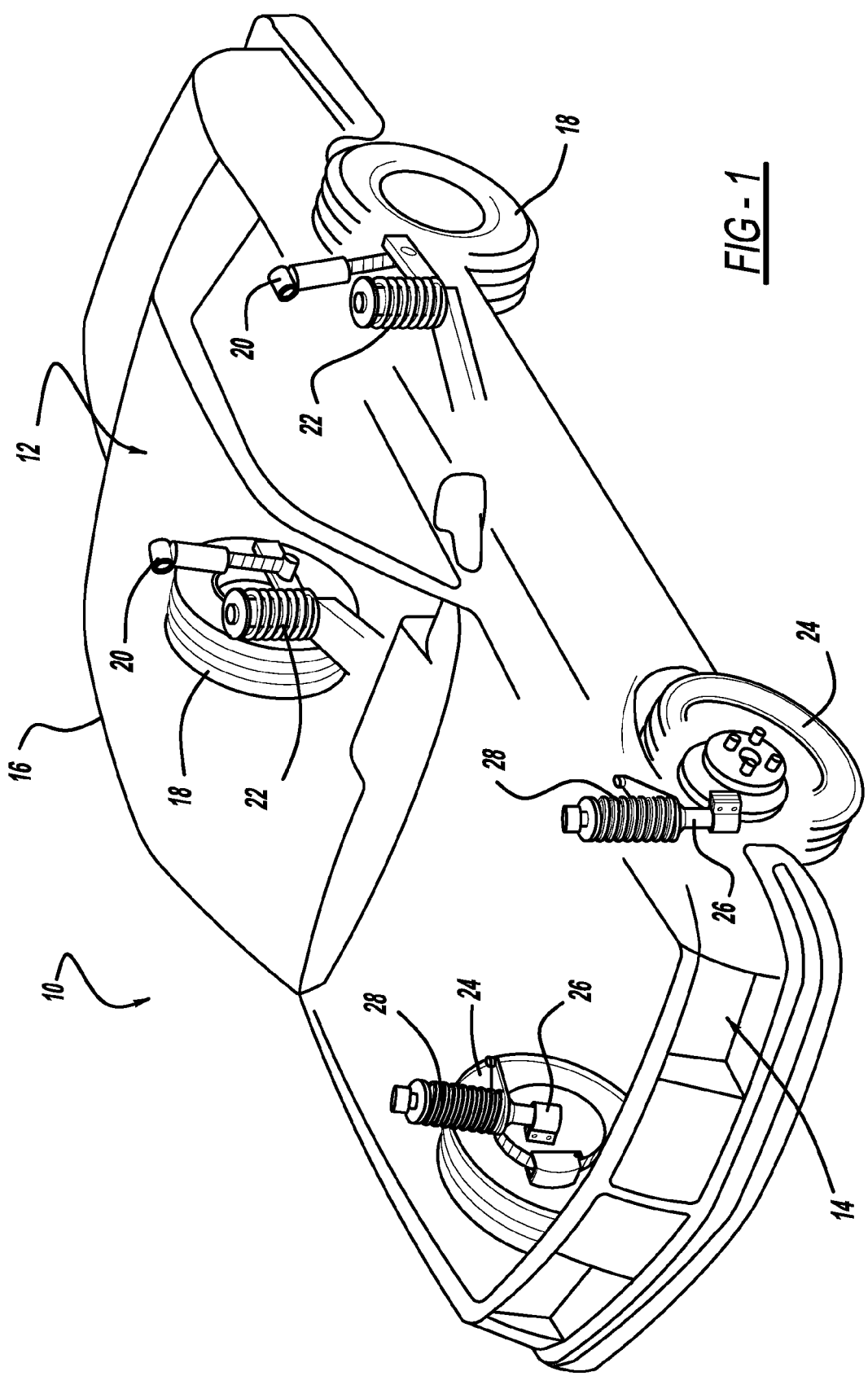
FIG. 1 is an illustration of an automobile incorporating the valving system in accordance with the present disclosure.

Referring now to the drawings in which like reference numerals designate like or corresponding parts throughout the several views, there is shown in FIG. 1 a vehicle incorporating a suspension system having the independent variable bleed system in accordance with the present disclosure which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e., front and rear suspensions 12 and 14, respectively) and the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent front and/or independent rear suspension systems. Further, the term "shock absorber" as used herein is meant to refer to dampers in general and thus will include McPherson struts.

Figure 2:
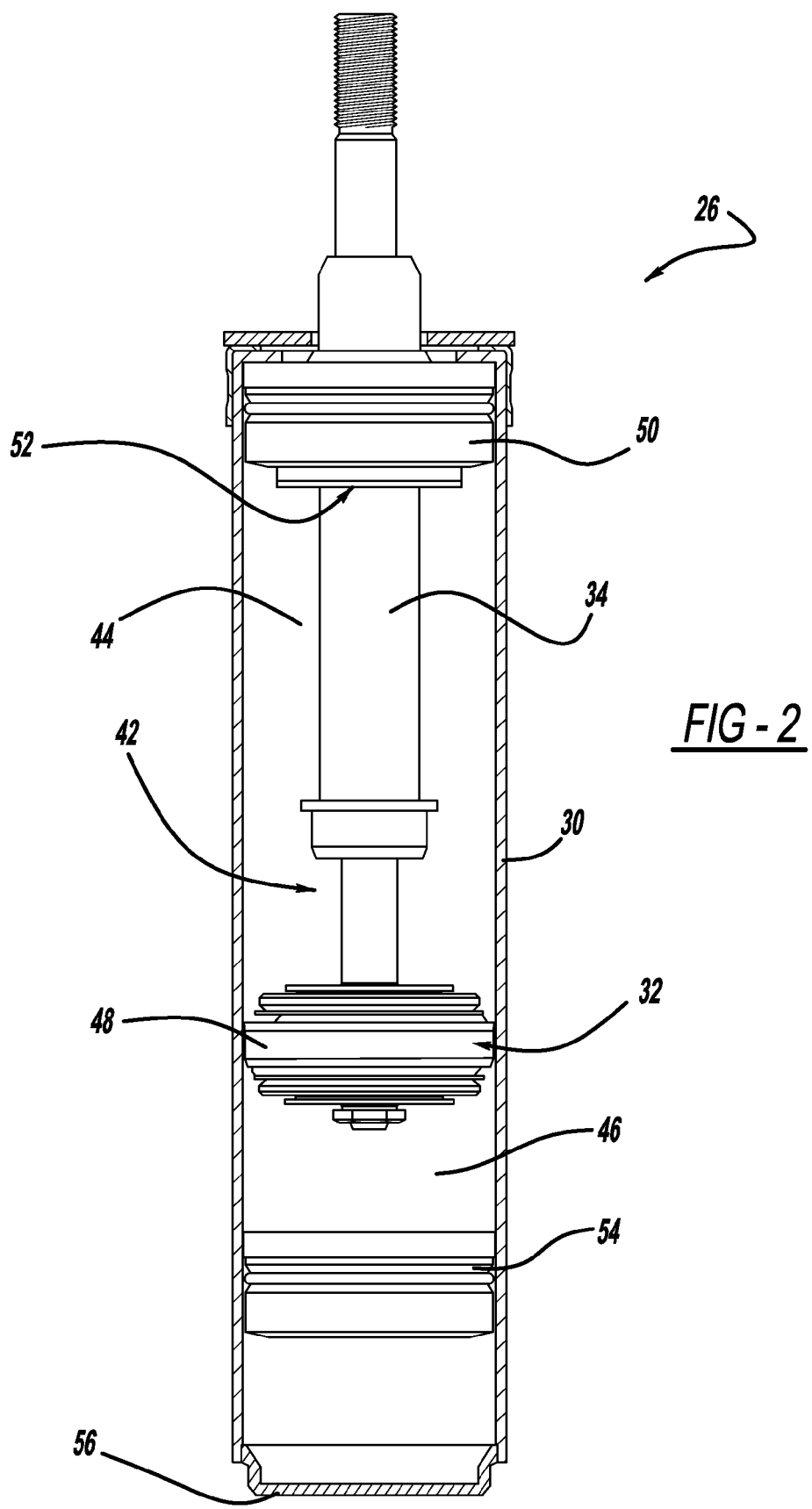
FIG. 2 is a side view, partially in cross-section, of a shock absorber incorporating the valving system in accordance with the present disclosure.

Referring now to FIG. 2, shock absorber 26 is shown in greater detail. While FIG. 2 shows only shock absorber 26, it is to be understood that shock absorber 20 also includes the variable bleed orifice valving in accordance with the present invention which is described below for shock absorber 26. Shock absorber 20 differs from shock absorber 26 in the way in which it is adapted to be connected to the sprung and unsprung portions of vehicle 10. Shock absorber 26 is illustrated in FIG. 2 as a mono-tube shock absorber. It is within the scope of the present disclosure to incorporate the piston assembly with the open bleed in dual-tube shock absorbers or any other type of shock absorber known in the art. Shock absorber 26 comprises a pressure tube 30, a piston assembly 32 and a piston rod 34.

Pressure tube 30 defines a fluid chamber 42. Piston assembly 32 is slidably disposed within pressure tube 30 and divides fluid chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system 52 seals the interface between upper end cap 50, pressure tube 30 and piston rod 34. The end of piston rod 34 opposite to piston assembly 32 is adapted, in the preferred embodiment, to be secured to the sprung portion of vehicle 10. Valving in piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference between the amount of fluid displaced in upper working chamber 44 and the amount of fluid displaced in lower working chamber 46. This difference in the amount of fluid displaced is known as the "rod volume" and this is compensated for by using a floating piston 54 as is well known in the art. While shock absorber 26 is being illustrated as a mono-tube shock absorber, it is within the scope of the present invention to utilize piston assembly 32 in a dual-tube designed shock absorber incorporating a base valve if desired. The bottom end of pressure tube 30 is closed by an end cap 56 which is adapted, in the preferred embodiment, to be connected to the unsprung portion of vehicle 10.

The present disclosure is directed to the full flow piston assembly 32 which includes variable bleed orifice valving for both rebound and compression strokes which is independent of the mid/high speed valving. Piston assembly 32 provides an independent tunable smooth transition between the low speed valving and the mid/high speed valving in both a compression movement and a rebound movement of shock absorber 26. The damping characteristics for both rebound (extension) and compression for shock absorber 26 are determined by piston assembly 32 thus eliminating the need for a base valve assembly.

Figure 3:
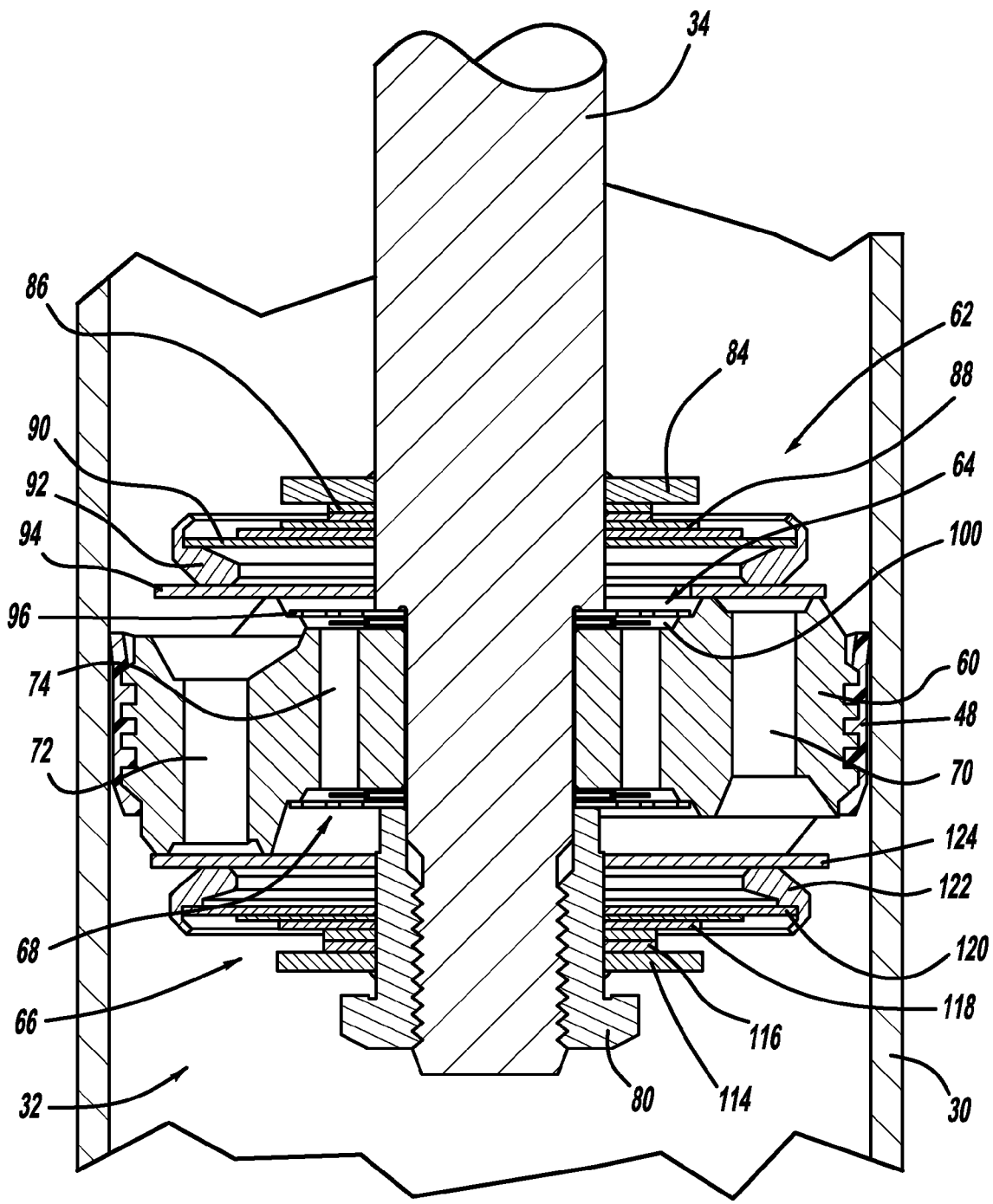
FIG. 3 is an enlarged side view of the piston assembly incorporating the valving system in accordance with the present disclosure.
Figure 4:
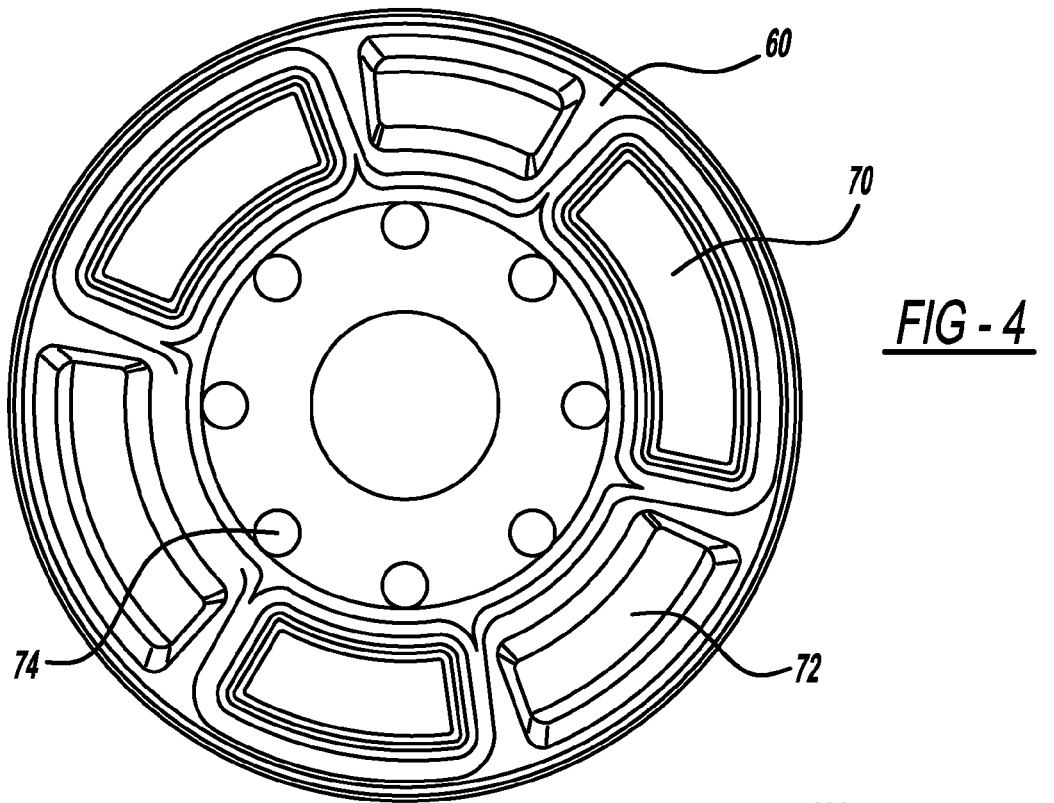
FIG. 4 is a top plan view of the piston illustrated in FIG. 3.
Figure 5A:
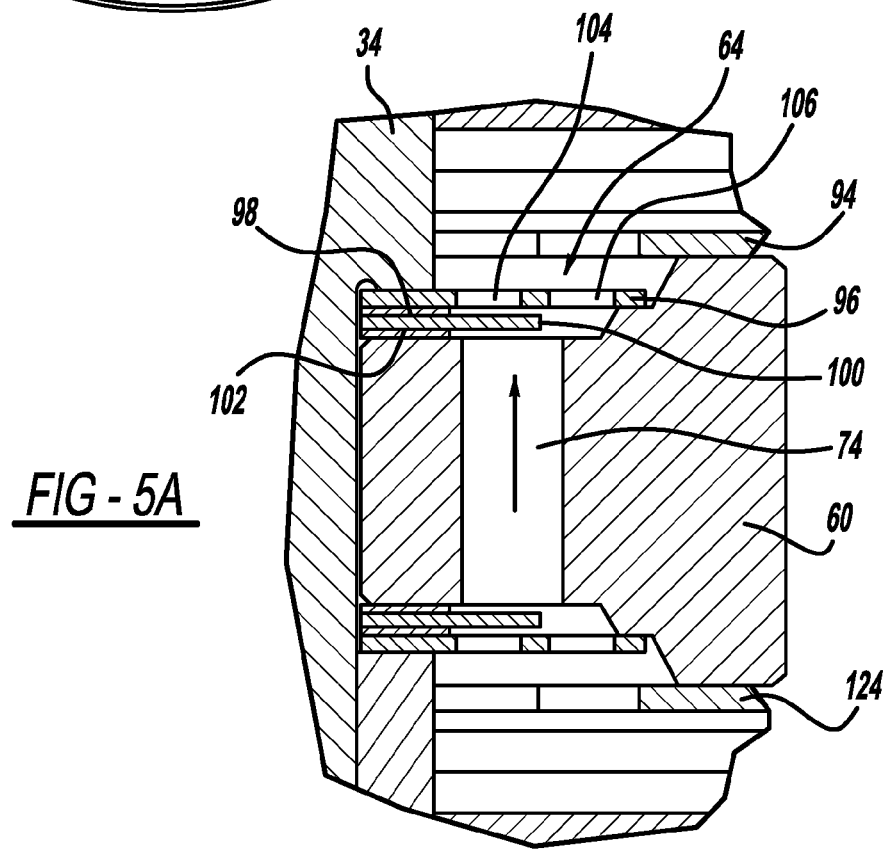
FIGS. 5a and 5b are side cross-sectional views showing the various flow passages which define the low speed bleed circuits in accordance with the present disclosure.
Figure 5B:
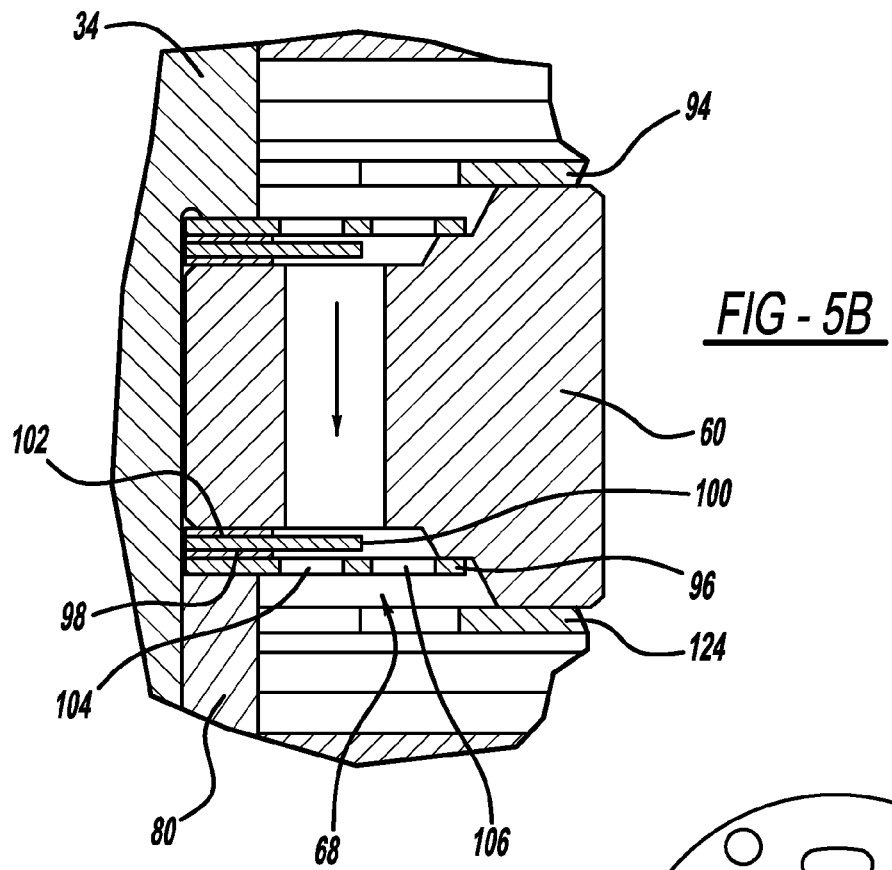

Referring now to FIGS. 3, 5A and 5B, piston assembly 32 comprises a piston body 60, a main compression valve assembly 62, a bleed compression valve assembly 64, a main rebound valve assembly 66 and a bleed rebound valve assembly 68. Piston body 60 is secured to piston rod 34 and it defines a plurality of main compression fluid passages 70, a plurality of main rebound fluid passages 72 and a plurality of bleed fluid passages 74. Piston body 60 abuts bleed compression valve assembly 64 which abuts a shoulder formed on piston rod 34. Piston body 60 also abuts bleed rebound valve assembly 68 which abuts a retaining nut 80 which secures piston body 60 and bleed valve assemblies 64 and 68 to piston rod 34.

Main compression valve assembly 62 comprises a support washer 84, a bending preload disc 86, a plurality of valve discs 88, an interface disc 90, an interface 92 and an intake valve disc 94. Support washer 84 is threadingly or slidingly received on piston rod 34 and is disposed above piston body 60. Support washer 84 is positioned on piston rod 34 such that the specified amount of preload is provided by valve discs 88 and interface disc 90 and then it is welded to piston rod 34 or secured to piston rod 34 by other means known in the art. Interface 92 and intake valve disc 94 are free to move axially with respect to piston rod 34 to open and close main compression fluid passages 70 while leaving main rebound fluid passages 72 and bleed fluid passage 74 open. The axial movement of interface 92 and intake valve disc 94 eliminates the need for these components to bend to open main compression fluid passages 70 and thus provide a full displacement valve disc for the assembly.

Figure 6A:
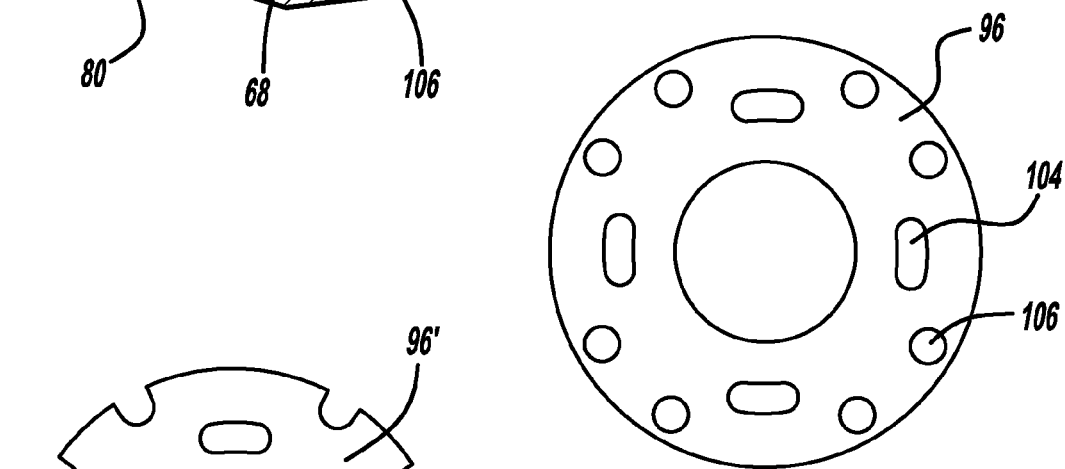
FIGS. 6a and 6b are top plan views of two different orifice discs which can be used in the low speed bleed circuits.
Figure 6B:
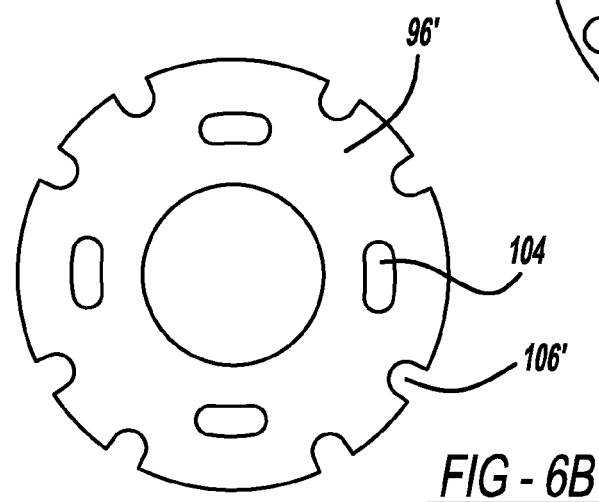

Bleed compression valve assembly 64 comprises an orifice disc 96, one or more first fulcrum discs 98, a closing disc 100 and one or more shim discs 102. Orifice disc 96 directly engages the shoulder formed on piston rod 34 and orifice disc 96 defines a first plurality of holes 104 and a second plurality of holes 106. The cross-sections in FIGS. 3 and 5a are taken through one of the plurality of holes 104 and one of the plurality of holes 106. As illustrated in FIGS. 6A and 6B, orifice disc 96 can be replaced by an orifice disc 96' where the plurality of holes 106 have been replaced by a plurality of holes or notches 106'.

Fulcrum discs 98 are disposed immediately adjacent orifice disc 96, closing disc 100 is disposed immediately adjacent fulcrum discs 98 and shim discs 102 are disposed directly between closing disc 100 and piston body 60. As illustrated in FIG. 5A, closing disc 100 is normally spaced from orifice disc 96 such that fluid is allowed to flow through holes 104. During a compression stroke, closing disc 100 will deflect upward, as shown in FIG. 5A, to contact orifice disc 96 between holes 104 and 106 to close holes 104.

Holes 104 and 106 define separate flow paths through orifice disc 96. Holes 106 define an always open flow path and holes 104 define a flow path that is normally open but the flow path through holes 104 will be closed by closing disc 100 during a compression stroke of piston assembly 32.

Main rebound valve assembly 66 comprises a support washer 114, a bending preload disc 116, a plurality of valve discs 118, an interface disc 120, an interface 122 and an intake valve disc 124. Support washer 114 is threadingly or slidingly received on retaining nut 80 and is disposed below piston body 60. Support washer 114 is positioned on retaining nut 80 such that the specified amount of preload is provided by valve discs 118 and interface disc 120 and then it is welded to retaining nut 80 or secured to retaining nut 80 by other means known in the art. Interface 122 and intake valve disc 124 are free to move axially with respect to piston rod 34 to open and close main rebound fluid passages 72 while leaving main compression fluid passages 70 and bleed fluid passage 74 open. The axial movement of interface 122 and intake valve disc 124 eliminates the need for these components to bend to open main rebound fluid passages 72 and thus provide a full displacement valve disc for the assembly.

Bleed rebound valve assembly 68 comprises orifice disc 96, one or more fulcrum discs 98, closing disc 100 and one or more shim discs 102. Orifice disc 96 directly engages retaining nut 80 and orifice disc 96 defines the first plurality of holes 104 and the second plurality of holes 106. The cross-sections in FIGS. 3 and 5B are taken through one of the plurality of holes 104 and one of the plurality of holes 106. As illustrated in FIGS. 6A and 6B, orifice disc 96 can be replaced by orifice disc 96' where the plurality of holes 106 have been replaced by the plurality of holes or notches 106'.

Fulcrum discs 98 are disposed immediately adjacent orifice disc 96, closing disc 100 is disposed immediately adjacent fulcrum discs 98 and shim discs 102 are disposed directly between closing disc 100 and piston body 60. As illustrated in FIG. 5B, closing disc 100 is normally spaced from orifice disc 96 such that fluid is allowed to flow through holes 104. During a rebound stroke, closing disc 100 will deflect downward, as shown if FIG. 5B, to contact orifice disc 96 between holes 104 and 106 to close holes 104.

Holes 104 and 106 define separate flow paths through orifice disc 96. Holes 106 define an always open flow path and holes 104 define a flow path that is normally open but the flow path through holes 104 will be closed by closing disc 100 during a rebound stroke of piston assembly 32.

During a compression stroke, there are three flows of fluid between lower working chamber 46 and upper working chamber 44. A compression stroke of piston assembly 32 causes the fluid pressure in lower working chamber 46, in the plurality of main compression fluid passages 70 and in the plurality of bleed fluid passages 74 to increase. Initially, fluid flows into bleed fluid passages 74, through holes 104 and 106 in orifice disc 96 of bleed rebound valve assembly 68, through bleed fluid passages 74, through holes 104 and 106 in orifice disc 96 of bleed compression valve assembly 64 and into upper working chamber 44. The first flow of fluid is through a continuously open fluid flow path through holes 106 in orifice disc 96 of bleed compression valve assembly 64 which allows fluid flow at zero or near zero velocity of piston assembly 32 during a compression stroke. In addition, a second fluid flow is through holes 104 in orifice disc 96 of bleed compression valve assembly 64. This makes it possible to eliminate the offset damping force at zero speed.

When the speed of piston assembly 32 increases, fluid pressure within the plurality of bleed fluid passages 74 will increase and the fluid pressure force applied to closing disc 100 will deflect closing disc 100 upward as shown in FIG. 5A to close the plurality of holes 104 in orifice disc 96 of bleed compression valve assembly 64 to shut off the second fluid flow and only allow fluid flow through holes 106 in orifice disc 96 of bleed compression valve assembly 64.

When the speed of piston assembly 32 increases further, fluid pressure within the plurality of main compression fluid passages 70 will increase and the fluid pressure force applied to intake valve disc 94 will overcome the biasing load of valve discs 88 and interface disc 90 and intake valve disc 94 will move axially to open the plurality of main compression fluid passages 70 to provide the third flow of fluid.

During a rebound stroke, there are also three flows of fluid between upper working chamber 44 and lower working chamber 46. A rebound stroke of piston assembly 32 causes the fluid pressure in upper working chamber 44, in the plurality of main rebound fluid passages 72 and in the plurality of bleed fluid passages 74 to increase. Initially, fluid flows into bleed fluid passages 74, through holes 104 and 106 in orifice disc 96 of bleed compression valve assembly 64, through bleed fluid passages 74, through holes 104 and 106 in orifice disc 96 of bleed rebound valve assembly 68 and into lower working chamber 46. The first flow of fluid is through a continuously open fluid flow path through holes 106 in orifice disc 96 of bleed rebound valve assembly 68 which allows fluid flow at zero or near zero velocity of piston assembly 32 during a rebound stroke. In addition, a second fluid flow is through holes 104 in orifice disc 96 of bleed rebound valve assembly 68. This makes it possible to eliminate the offset damping force at zero speed.

When the speed of piston assembly 32 increases, fluid pressure within the plurality of bleed fluid passages 74 will increase and the fluid pressure force applied to closing disc 100 will deflect closing disc 100 downward as illustrated in FIG. 5B to close the plurality of holes 104 in orifice disc 96 of bleed rebound valve assembly 68 to shut off the second fluid flow and only allow fluid flow through holes 106 in orifice disc 96 of bleed rebound valve assembly 68.

When the speed of piston assembly 32 increases further, fluid pressure within the plurality of main rebound fluid passages 72 will increase and the fluid pressure force applied to intake valve disc 124 will overcome the biasing load of valve discs 118 and interface disc 120 and intake valve disc 124 will move axially to open the plurality of main rebound fluid passages 72 to provide the third flow of fluid.

The tuning of the main fluid flow can be controlled by controlling the size and number of passages 70 and 72, the design of valve discs 88 and 118 and interface discs 90 and 120 as well as other design features for shock absorber 26. The tuning of the bleed fluid flow can be controlled by controlling the size and number of bleed fluid passages 74, the size and number of holes 104 and 106 and by controlling the thicknesses of fulcrum discs 98 and closing disc 100. This will control the piston velocity at which the second flow path through holes 104 will be closed.

Figure 7:
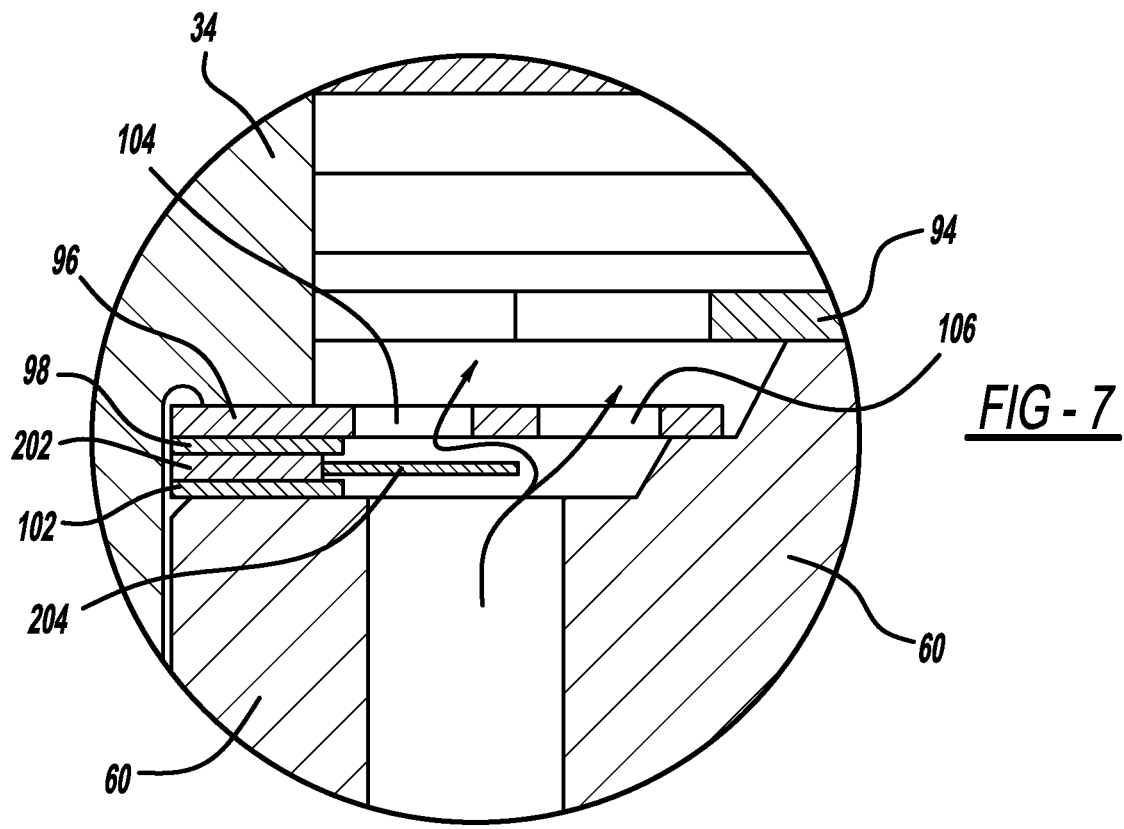
FIG. 7 is a side cross-sectional view illustrating a low bleed circuit in accordance with another embodiment of the present disclosure.
Figure 8:
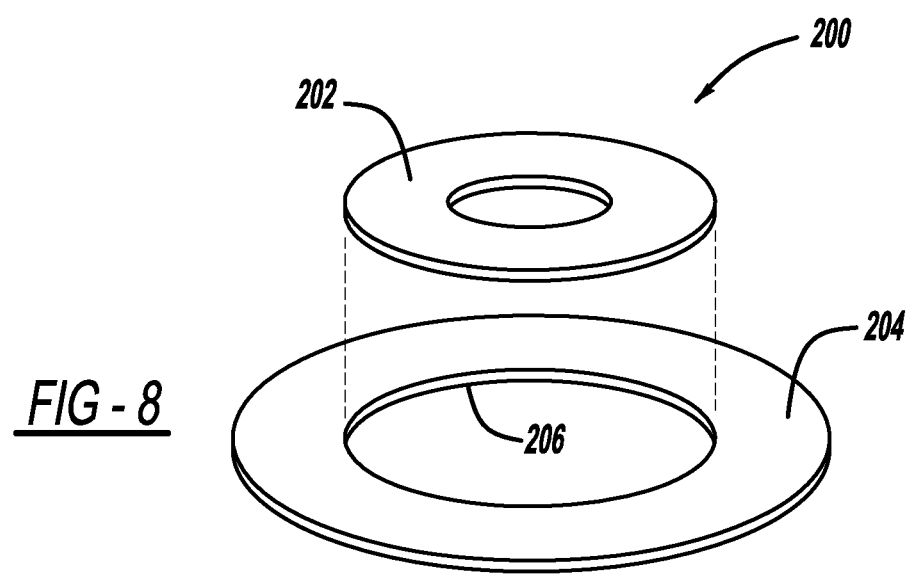
FIG. 8 is an exploded view of the closing disc illustrated in FIG. 7.

Referring now to FIGS. 7 and 8, a closing disc assembly 200 is disclosed. Closing disc assembly 200 is a direct replacement for closing disc 100. Closing disc assembly 200 comprises a centering disc 202 and a closing disc 204. Centering disc 202 is disposed within an aperture 206 defined by closing disc 204. The thickness of centering disc 202 is equal to or larger than the thickness of closing disc 204 to allow axial movement of closing disc 204 between fulcrum discs 98 and shim discs 102. The outside diameter of centering disc 202 is slightly smaller than the outside diameter of fulcrum discs 98 and shim discs 102. Typically the outside diameter of centering disc 202 is 0.5 mm smaller than the outside diameter of fulcrum discs 98 and shim discs 102 which have the same outside diameter. This configuration increases the flexibility of closing disc assembly 200.

During a compression stroke, there are three flows of fluid between lower working chamber 46 and upper working chamber 44. A compression stroke of piston assembly 32 causes the fluid pressure in lower working chamber 46, in the plurality of main compression fluid passages 70 and in the plurality of bleed fluid passages 74 to increase. Initially, fluid flows into bleed fluid passages 74, through holes 104 and 106 in orifice disc 96 of bleed rebound valve assembly 68, through bleed fluid passages 74, through holes 104 and 106 in orifice disc 96 of bleed compression valve assembly 64 and into upper working chamber 44. The first flow of fluid is through a continuously open fluid flow path through holes 106 in orifice disc 96 of bleed compression valve assembly 64 which allows fluid flow at zero or near zero velocity of piston assembly 32 during a compression stroke. In addition, a second fluid flow is through holes 104 in orifice disc 96 of bleed compression valve assembly 64. This makes it possible to eliminate the offset damping force at zero speed.

When the speed of piston assembly 32 increases, fluid pressure within the plurality of bleed fluid passages 74 will increase and the fluid pressure force applied to closing disc assembly 200 will deflect closing disc 204 upward as shown in FIG. 7 to close the plurality of holes 104 in orifice disc 96 of bleed compression valve assembly 64 to shut off the second fluid flow and only allow fluid flow through holes 106 in orifice disc 96 of bleed compression valve assembly 64.

When the speed of piston assembly 32 increases further, fluid pressure within the plurality of main compression fluid passages 70 will increase and the fluid pressure force applied to intake valve disc 94 will overcome the biasing load of valve discs 88 and interface disc 90 and intake valve disc 94 will move axially to open the plurality of main compression fluid passages 70 to provide the third flow of fluid.

During a rebound stroke, there are also three flows of fluid between upper working chamber 44 and lower working chamber 46. A rebound stroke of piston assembly 32 causes the fluid pressure in upper working chamber 44, in the plurality of main rebound fluid passages 72 and in the plurality of bleed fluid passages 74 to increase. Initially, fluid flows into bleed fluid passages 74, through holes 104 and 106 in orifice disc 96 of bleed compression valve assembly 64, through bleed fluid passages 74, through holes 104 and 106 in orifice disc 96 of bleed rebound valve assembly 68 and into lower working chamber 46. The first flow of fluid is through a continuously open fluid flow path through holes 106 in orifice disc 96 of bleed rebound valve assembly 68 which allows fluid flow at zero or near zero velocity of piston assembly 32 during a rebound stroke. In addition, a second fluid flow is through holes 104 in orifice disc 96 of bleed rebound valve assembly 68. This makes it possible to eliminate the offset damping force at zero speed.

When the speed of piston assembly 32 increases, fluid pressure within the plurality of bleed fluid passages 74 will increase and the fluid pressure force applied to closing disc assembly 200 will deflect closing disc 204 downward as illustrated in FIG. 5B to close the plurality of holes 104 in orifice disc 96 of bleed rebound valve assembly 68 to shut off the second fluid flow and only allow fluid flow through holes 106 in orifice disc 96 of bleed rebound valve assembly 68.

When the speed of piston assembly 32 increases further, fluid pressure within the plurality of main rebound fluid passages 72 will increase and the fluid pressure force applied to intake valve disc 124 will overcome the biasing load of valve discs 118 and interface disc 120 and intake valve disc 124 will move axially to open the plurality of main rebound fluid passages 72 to provide the third flow of fluid.

Referring now to FIGS. 9 and 10A-10D, a piston assembly 232 comprises piston body 60, main compression valve assembly 62, a bleed compression valve assembly 264, main rebound valve assembly 66 and a bleed rebound valve assembly 268. Piston body 60 is secured to piston rod 34 and it defines the plurality of main compression fluid passages 70, the plurality of main rebound fluid passages 72 and the plurality of bleed fluid passages 74. Piston body 60 abuts the shoulder formed on piston rod 34 and retaining nut 80.

Main compression valve assembly 62 comprises support washer 84, bending preload disc 86, the plurality of valve discs 88, interface disc 90, interface 92 and intake valve disc 94. Support washer 84 is threadingly or slidingly received on piston rod 34 and is disposed above piston body 60. Support washer 84 is positioned on piston rod 34 such that the specified amount of preload is provided by valve discs 88 and interface disc 90 and then it is welded to piston rod 34 or secured to piston rod 34 by other means known in the art. Interface 92 and intake valve disc 94 are free to move axially with respect to piston rod 34 to open and close main compression fluid passages 70 while leaving main rebound fluid passages 72 and bleed fluid passage 74 open. The axial movement of interface 92 and intake valve disc 94 eliminates the need for these components to bend to open main compression fluid passages 70 and thus provide a full displacement valve disc for the assembly.

Bleed compression valve assembly 264 comprises an orifice disc 96, a fulcrum disc 98, a closing disc 100 and a wave spring 302 or any other biasing member known in the art. Orifice disc 96 directly engages piston body 60 and orifice disc 96 defines a first plurality of holes or slots 104.

Figure 10A:
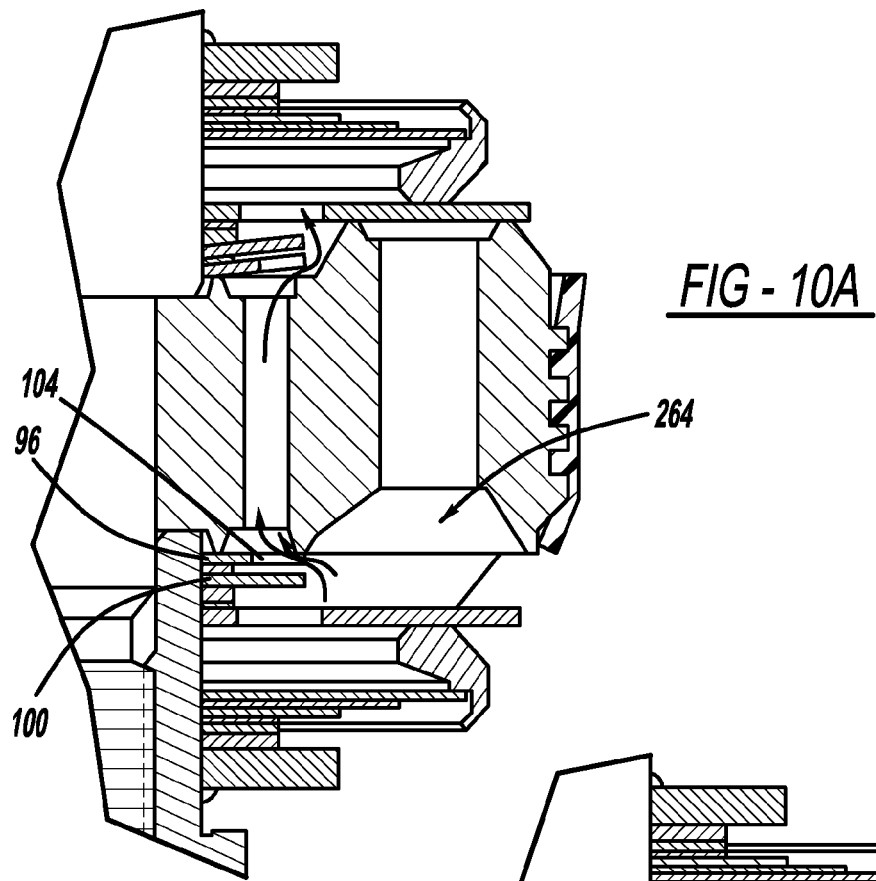
FIGS. 10A-10D are side cross-sectional views showing the various flow passages which define the low bleed circuits in accordance with the embodiment illustrated in FIG. 9.
Figure 10B:
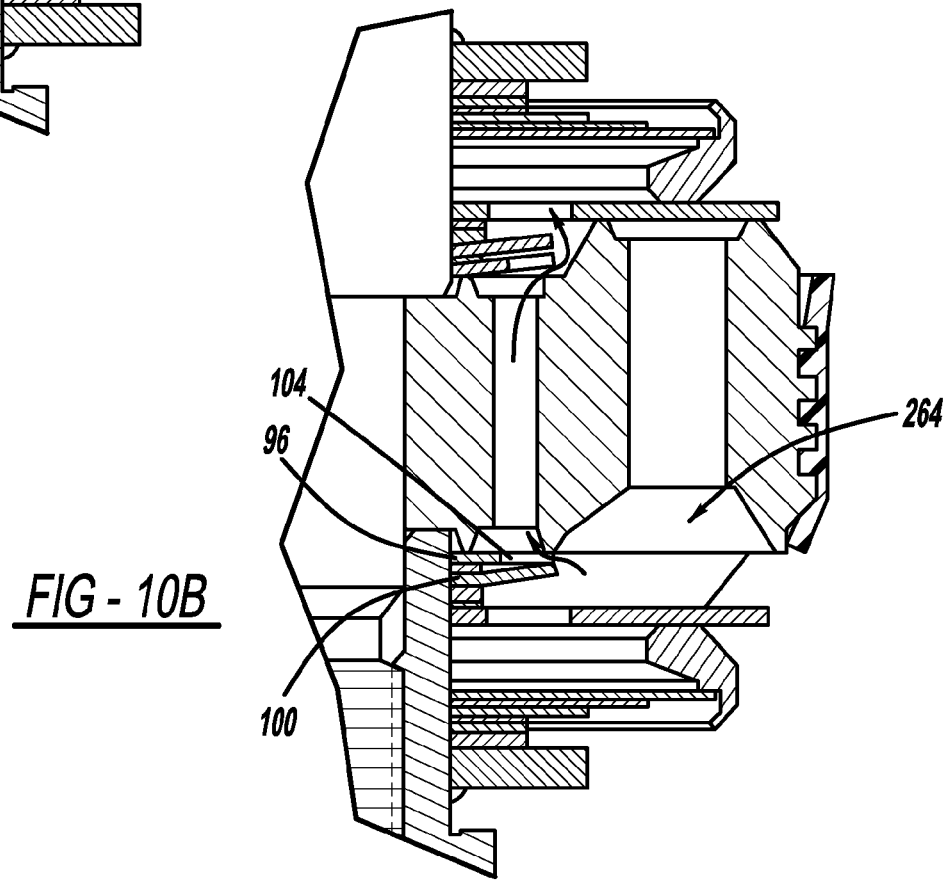

Fulcrum disc 98 is disposed immediately adjacent orifice disc 96, closing disc 100 is disposed immediately adjacent fulcrum disc 98 and wave spring 302 is disposed directly between closing disc 100 and intake valve disc 124 of main rebound valve assembly 66. Orifice disc 96, fulcrum disc 98 and closing disc 100 are able to slide axially on retaining nut 80 due to the flexing of wave spring 302. As illustrated in FIG. 10A, closing disc 100 is normally spaced from orifice disc 96 such that fluid is allowed to flow through slots 104 as illustrated in FIG. 10A. Fluid flows in both an axial direction through slots 104 and radially through slots 104. During a compression stroke, closing disc 100 will deflect upward, as shown in FIG. 10B, to contact orifice disc 96 to prohibit the axial flow through slots 104 while permitting the radial flow through slots 104.

Slots 104 define two flow paths through orifice disc 96. The radial flow path defines an always open flow path and the axial flow path defines a flow path that will be closed by closing disc 100 during a compression stroke of piston assembly 32.

Main rebound valve assembly 66 comprises support washer 114, bending preload disc 116, the plurality of valve discs 118, interface disc 120, interface 122 and intake valve disc 124. Support washer 114 is threadingly or slidingly received on retaining nut 80 and is disposed below piston body 60. Support washer 114 is positioned on retaining nut 80 such that the specified amount of preload is provided by valve discs 118 and interface disc 120 and then it is welded to retaining nut 80 or secured to retaining nut 80 by other means known in the art. Interface 122 and intake valve disc 124 are free to move axially with respect to piston rod 34 to open and close main rebound fluid passages 72 while leaving main compression fluid passages 70 and bleed fluid passage 74 open. The axial movement of interface 122 and intake valve disc 124 eliminates the need for these components to bend to open main rebound fluid passages 72 and thus provide a full displacement valve disc for the assembly.

Figure 9:
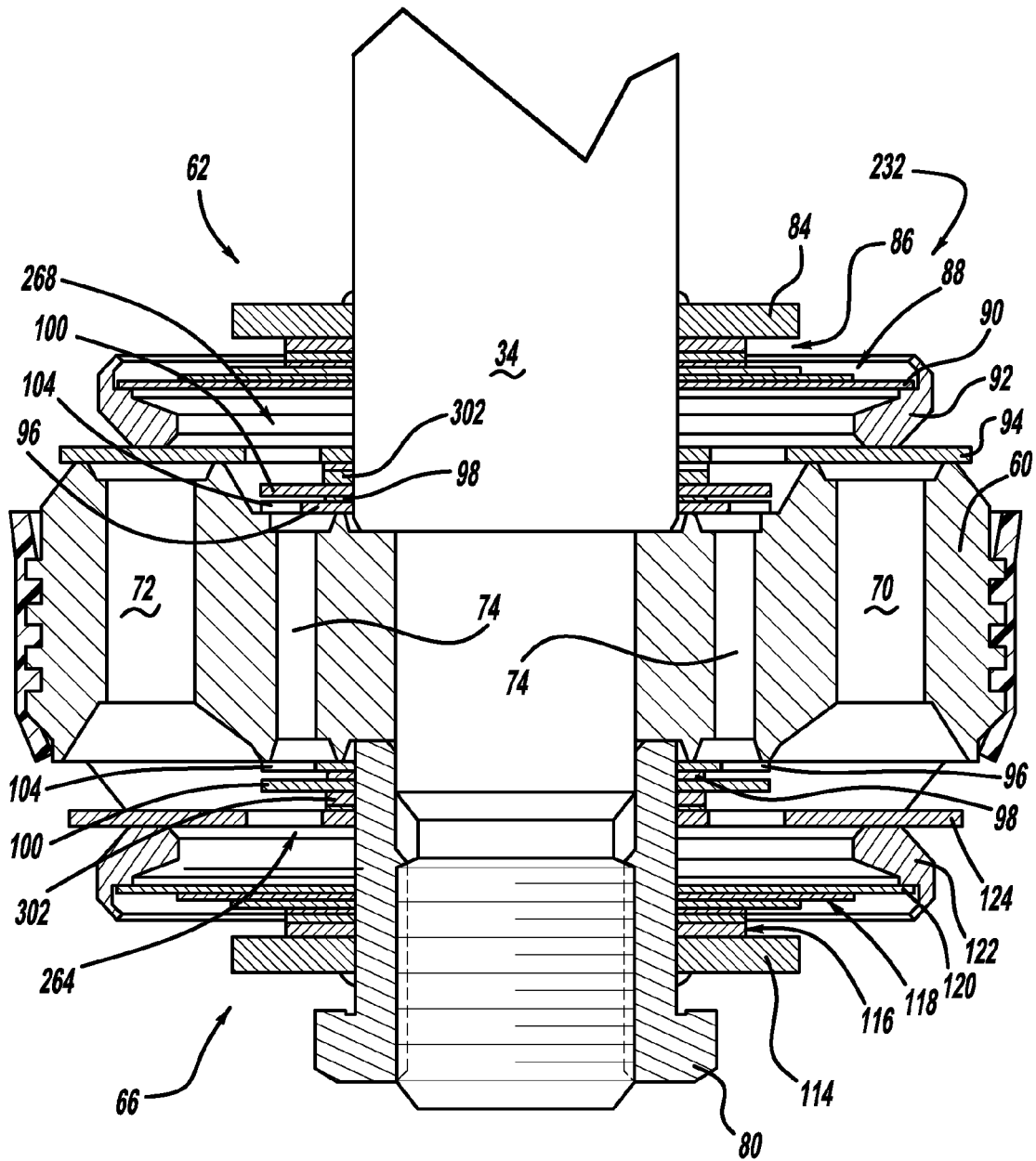
FIG. 9 is a side cross-sectional view illustrating a low bleed circuit in accordance with another embodiment of the present disclosure.

Bleed rebound valve assembly 268 comprises orifice disc 96, fulcrum disc 98, closing disc 100 and a wave spring 302 or any other biasing member known in the art. Orifice disc 96 directly engages piston body 60 and orifice disc 96 defines the first plurality of slots 104. The cross-sections in FIGS. 9 and 10B are taken through one of the plurality of slots 104.

Figure 10C:
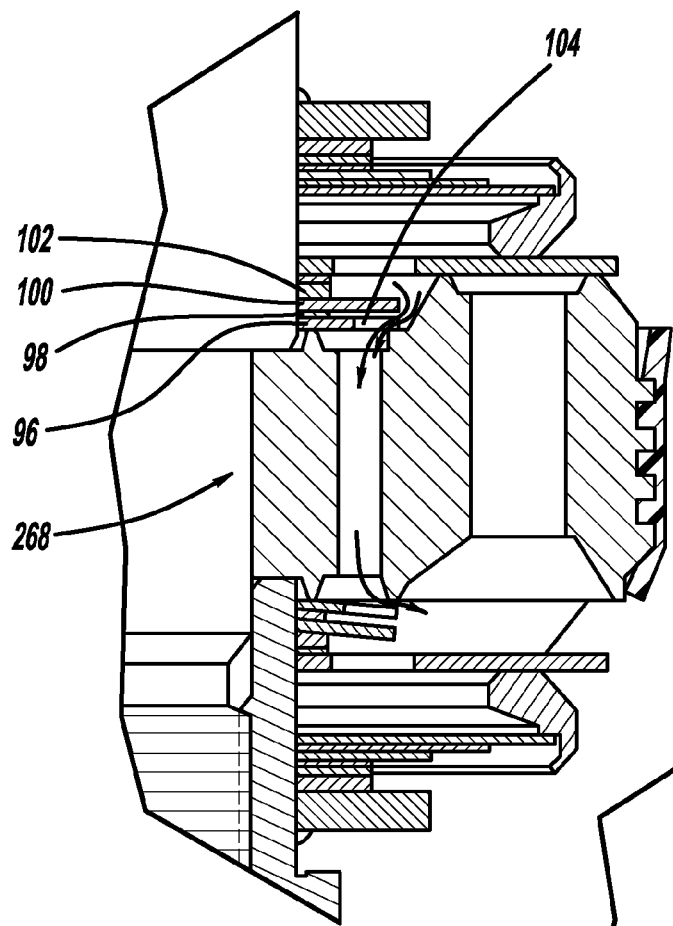

Fulcrum disc 98 is disposed immediately adjacent orifice disc 96, closing disc 100 is disposed immediately adjacent fulcrum disc 98 and wave spring 302 are disposed directly between closing disc 100 and intake valve disc 94 of main compression valve assembly 62. Orifice disc 96, fulcrum disc 98 and closing disc 100 are able to slide axially on retaining nut 80 due to the flexing of wave spring 302. As illustrated in FIG. 10C, closing disc 100 is normally spaced from orifice disc 96 such that fluid is allowed to flow through slots 104 as illustrated in FIG. 10C. Fluid flows in both an axial direction through slots 104 and radially through slots 104. During a rebound stroke, closing disc 100 will deflect downward, as shown if FIG. 10D, to contact orifice disc 96 to prohibit the axial flow through slots 104 while permitting the radial flow through slots 104.

Slots 104 define two flow paths through orifice disc 96. The radial flow defines an always open flow path and the axial flow defines a flow path that will be closed by closing disc 100 during a rebound stroke of piston assembly 32.

During a compression stroke, there are three flows of fluid between lower working chamber 46 and upper working chamber 44. A compression stroke of piston assembly 32 causes the fluid pressure in lower working chamber 46 and in the plurality of main compression fluid passages 70 to increase. Initially, fluid flows into bleed fluid passages 74, through slots 104 in orifice disc 96 of bleed compression valve assembly 264 in both an axial and radial direction, through bleed fluid passages 74 and into upper working chamber 44. As illustrated in FIG. 10A, the first flow of fluid is through a continuously open radial fluid flow path through slots 104 in orifice disc 96 of bleed compression valve assembly 264 which allows fluid flow at zero or near zero velocity of piston assembly 32 during a compression stroke. In addition, a second fluid flow is axially through slots 104 in orifice disc 96 of bleed compression valve assembly 264. This makes it possible to eliminate the offset damping force at zero speed.

When the speed of piston assembly 32 increases, fluid pressure within lower working chamber 46 will increase and the fluid pressure force applied to closing disc 100 will elastically deflect closing disc 100 upward as shown in FIG. 10B to close the axial flow through slots 104 in orifice disc 96 of bleed compression valve assembly 264 to shut off the second fluid flow and only allow fluid flow radially through slots 104 in orifice disc 96 of bleed compression valve assembly 264.

When the speed of piston assembly 32 increases further, fluid pressure within the plurality of main compression fluid passages 70 will increase and the fluid pressure force applied to intake valve disc 94 will overcome the biasing load of valve discs 88 and interface disc 90 and intake valve disc 94 will move axially to open the plurality of main compression fluid passages 70 to provide the third flow of fluid.

During a rebound stroke, there are also three flows of fluid between upper working chamber 44 and lower working chamber 46. A rebound stroke of piston assembly 32 causes the fluid pressure in upper working chamber 44 and in the plurality of main rebound fluid passages 72 to increase. Initially, fluid flows into bleed fluid passages 74 through slots 104 in orifice disc 96 of bleed rebound valve assembly 268 in both an axial and radial direction, through bleed fluid passages 74 and into lower working chamber 46. As illustrated in FIG. 10C, the first flow of fluid is through a continuously open radial fluid flow path through slots 104 in orifice disc 96 of bleed rebound valve assembly 268 which allows fluid flow at zero or near zero velocity of piston assembly 32 during a rebound stroke. In addition, a second fluid flow is axially through slots 104 in orifice disc 96 of bleed rebound valve assembly 268. This makes it possible to eliminate the offset damping force at zero speed.

Figure 10D:
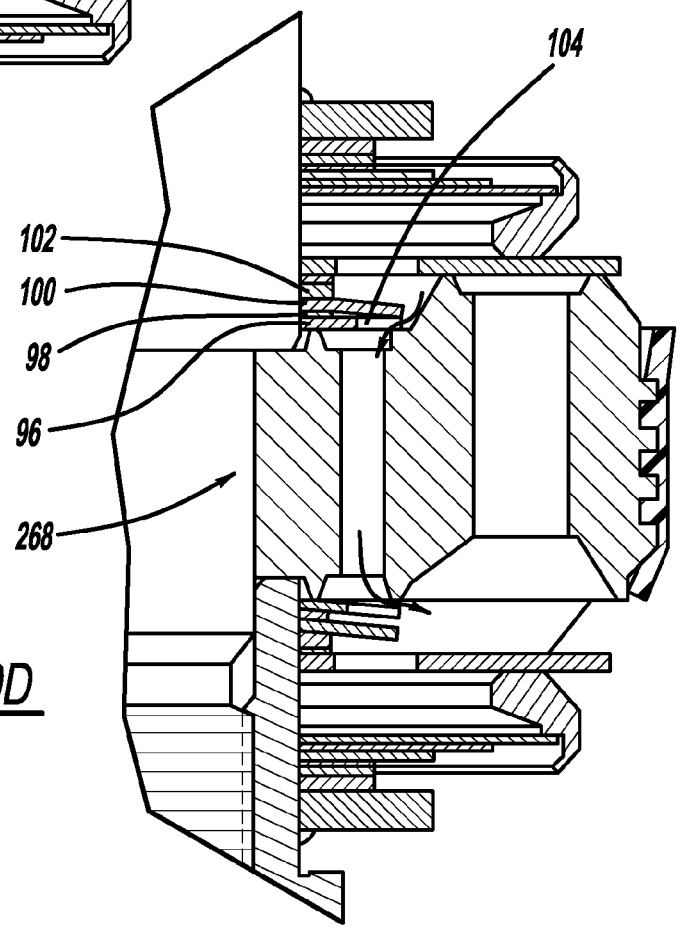

When the speed of piston assembly 32 increases, fluid pressure within upper working chamber 44 will increase and the fluid pressure force applied to closing disc 100 will elastically deflect closing disc 100 downward as illustrated in FIG. 10D to close the axial flow through slots 104 in orifice disc 96 of bleed rebound valve assembly 68 to shut off the second fluid flow and only allow fluid flow radially through slots 104 in orifice disc 96 of bleed rebound valve assembly 68.

When the speed of piston assembly 32 increases further, fluid pressure within the plurality of main rebound fluid passages 72 will increase and the fluid pressure force applied to intake valve disc 124 will overcome the biasing load of valve discs 118 and interface disc 120 and intake valve disc 124 will move axially to open the plurality of main rebound fluid passages 72 to provide the third flow of fluid.

The tuning of the main fluid flow can be controlled by controlling the size and number of passages 70 and 72, the design of valve discs 88 and 118 and interface discs 90 and 120 as well as other design features for shock absorber 26. The tuning of the bleed fluid flow can be controlled by controlling the size and number of bleed fluid passages 74, the size and number of slots 104 and by controlling the thicknesses of fulcrum disc 98 and closing disc 100. This will control the piston velocity at which the second flow path axially through slots 104 will be closed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber comprising:
    a pressure tube defining a fluid chamber;
    a piston disposed within said fluid chamber, said piston dividing said fluid chamber into an upper working chamber and a lower working chamber;
    a compression passage extending through said piston between said upper and said lower working chambers;
    a compression valve assembly engaging said piston, said compression valve assembly closing said compression passage;
    a rebound passage extending through said piston between said upper and said lower working chambers;
    a rebound valve assembly engaging said piston, said rebound valve assembly closing said rebound passage;
    a bleed passage extending through said piston between said upper and said lower working chambers;
    a first bleed valve assembly engaging said piston, said first bleed valve assembly and said bleed passage defining a first flow path between said upper and lower working chambers extending through said piston and a second flow path between said upper and lower working chambers extending through said piston, said second flow path being different from said first flow path; wherein said first bleed valve assembly includes a first closing disc and a first orifice disc, said first closing disc movable between a first position where said first closing disc is spaced from said first orifice disc to open said second flow path and a second position where a said first closing disc is in direct engagement with said first orifice disc to close said second flow path.

2. The shock absorber according to claim 1, further comprising a second bleed valve assembly engaging said piston, said second bleed valve assembly and said bleed passage defining a third flow path extending through said piston and a fourth flow path extending through said piston, said fourth flow path being different from said third flow path.

3. The shock absorber according to claim 2, wherein said first orifice disc is disposed adjacent first centering disc, and said second bleed assembly includes a second orifice disc and a second closing disc disposed adjacent a second centering disc, said second closing disc movable between a first position where said fourth flow path is open and a second position where said fourth flow path is closed.

4. The shock absorber according to claim 3, wherein a thickness of said first closing disc is less than or equal to a thickness of said first orifice disc and a thickness of said second closing disc is less than or equal to a thickness of said second orifice disc.

5. The shock absorber according to claim 2, wherein said first and third flow paths are always open flow paths.

6. The shock absorber according to claim 2, wherein said second bleed valve assembly includes a second closing disc movable between a first position where said fourth flow path is open and a second position where said second flow path is closed.

7. The shock absorber according to claim 1, wherein said first bleed valve assembly includes a fulcrum disc disposed between said first orifice disc and said first closing disc.

8. The shock absorber according to claim 7, wherein a thickness of said first closing disc is less than or equal to a thickness of said first orifice disc.

9. The shock absorber according to claim 7, wherein said first closing disc elastically deflects to move between said first position and said second position.

10. The shock absorber according to claim 1, wherein said first orifice disc defines a first aperture defining said first fluid path and a second aperture defining said second fluid path.

11. The shock absorber according to claim 10, wherein said first orifice disc is disposed around a centering disc.

12. The shock absorber according to claim 11, wherein a thickness of said first closing disc is less than or equal to a thickness of said first orifice disc.

13. The shock absorber according to claim 1, wherein said first orifice disc is disposed adjacent said first closing disc.

14. The shock absorber according to claim 13, wherein a thickness of said first closing disc is less than or equal to a thickness of said first orifice disc.

15. The shock absorber according to claim 1, wherein said first orifice disc is disposed around a centering disc.

16. The shock absorber according to claim 15, wherein a thickness of said first closing disc is less than or equal to a thickness of said first orifice disc.

17. The shock absorber according to claim 1, wherein said first flow path is an always open flow path.

18. The shock absorber according to claim 1, wherein movement of said piston within said chamber moves said closing disc from said first position where said second flow path is open to said second position where said second flow path is closed.

19. The shock absorber according to claim 1, wherein said second flow path is fully closed when said closing disc is in said second position.

* * * * *